(12) United States Patent
Bae

(10) Patent No.: US 11,606,009 B2
(45) Date of Patent: Mar. 14, 2023

(54) MOTOR CONTROL APPARATUS AND METHOD FOR SECURING INSULATION PERFORMANCE

(71) Applicants: HYUNDAI MOTOR COMPANY, Seoul (KR); KIA CORPORATION, Seoul (KR)

(72) Inventor: Kyung Gook Bae, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/376,614

(22) Filed: Jul. 15, 2021

(65) Prior Publication Data

US 2022/0037966 A1    Feb. 3, 2022

(30) Foreign Application Priority Data

Jul. 29, 2020 (KR) ........................ 10-2020-0094464

(51) Int. Cl.
| | |
|---|---|
| *H02K 11/25* | (2016.01) |
| *H02P 29/032* | (2016.01) |
| *G01S 19/53* | (2010.01) |
| *H01F 5/06* | (2006.01) |
| *H02K 11/00* | (2016.01) |

(52) U.S. Cl.
CPC .............. *H02K 11/25* (2016.01); *G01S 19/53* (2013.01); *H01F 5/06* (2013.01); *H02K 11/0094* (2013.01); *H02P 29/032* (2016.02)

(58) Field of Classification Search
CPC ... H02K 11/25; H02K 11/0094; H02P 29/032; G01S 19/53; H01F 5/06
USPC .......................................................... 310/680
See application file for complete search history.

(56) References Cited

FOREIGN PATENT DOCUMENTS

| | | | | |
|---|---|---|---|---|
| CN | 103625473 A | * | 3/2014 | ............ B60W 10/08 |
| JP | 2003304604 A | * | 10/2003 | |
| JP | 2010239791 A | * | 10/2010 | |
| JP | 2012231644 A | * | 11/2012 | |
| KR | 10-2015-0011940 | | 2/2015 | |
| KR | 10-2018-0115264 | | 10/2018 | |

* cited by examiner

*Primary Examiner* — Mahmoud Gimie
(74) *Attorney, Agent, or Firm* — Lempia Summerfield Katz LLC

(57) ABSTRACT

A motor control apparatus for securing insulation performance includes: a temperature sensor detecting a temperature of a motor; an altitude detection means providing information on an altitude at which the motor is positioned; and a controller including a motor output map having a plurality of groups of map data in which motor output limit rates depending on temperatures of the motor are pre-stored for each preset altitude section, selecting one group of map data corresponding to the information on the altitude provided by the altitude detection means, and determining a motor output limit rate by applying the temperature detected by the temperature sensor to the selected group of map data.

7 Claims, 3 Drawing Sheets

MOTOR CONTROL APPARATUS AND METHOD FOR SECURING INSULATION PERFORMANCE

CROSS REFERENCE TO RELATED APPLICATION

The present application claims priority to and the benefit of Korean Patent Application No. 10-2020-0094464, filed Jul. 29, 2020, the entire contents of which are incorporated herein by reference.

FIELD

The present disclosure relates to a motor control apparatus and method for securing insulation performance thereof, which are capable of preventing an insulation breakdown of a motor.

BACKGROUND

The statements in this section merely provide background information related to the present disclosure and may not constitute prior art.

An eco-friendly vehicle such as a hybrid vehicle or an electric vehicle is powered by an electric motor converting electrical energy into rotating mechanical energy.

In the motor, a partial discharge may occur due to a difference in voltage between stator coils. When the occurrence of the partial discharge is continuous, coatings insulating the stator coils may be damaged, resulting in a deterioration in insulation performance.

Accordingly, we have discovered that it is desired to apply a motor control technology to the electrically-driven vehicle including the motor to maintain the insulated state of the stator coils provided in the motor.

The contents described as the related art have been provided only to assist in understanding the background of the present disclosure and should not be considered as corresponding to the related art known to those having ordinary skill in the art.

SUMMARY

The present disclosure provides a motor control apparatus and method for securing insulation performance capable of inhibiting or preventing an insulation breakdown from occurring on a motor stator coil due to a partial discharge while considering conditions associated with the occurrence of the partial discharge causing a deterioration in the insulation performance of the motor stator coil.

According to one form of the present disclosure, a motor control apparatus for securing insulation performance includes: a temperature sensor detecting a temperature of a motor; an altitude detection means providing a current altitude of the motor at which the motor is positioned; and a controller including a motor output map having a plurality of groups of map data in which motor output limit rates depending on temperatures of the motor are pre-stored for each preset altitude section. In particular, the controller may select one group of map data, among the plurality of groups of map data, based on the current altitude of the motor provided by the altitude detection means, and determine a motor output limit rate by applying the temperature detected by the temperature sensor to the selected group of map data.

The altitude detection means may be a navigator calculating the current altitude of the motor based on a current altitude of a vehicle including the motor through a global positioning system (GPS) signal.

The altitude detection means may be a navigator having a database in which altitudes corresponding to latitudes and longitudes are pre-stored, and the navigator may calculate a current latitude and a current longitude of a vehicle including the motor based on a signal from the GPS, and derive the altitude from the database based on the calculated latitude and longitude of the vehicle.

The plurality of groups of map data may be set such that a reference value for the temperature of the motor at which a limit on an output of the motor is started is greater in a lower altitude section.

The controller may determine an output of the motor by applying the motor output limit rate determined based on the selected group of map data to a torque command or a current command of the motor determined by a driver of a vehicle including the motor.

According to another form of the present disclosure, a motor control method applied to the motor control apparatus described above includes: receiving, by the controller, the current altitude of the motor from the altitude detection means and the temperature of the motor from the temperature sensor; selecting, by the controller, one group of map data, among a plurality of groups of map data in which motor output limit rates depending on temperatures of the motor are pre-stored for each preset altitude section, by comparing the current altitude with reference values by which the plurality of groups of map data are divided for a plurality of altitude sections; and determining, by the controller, a motor output limit rate from the selected group of map data based on the temperature of the motor.

In the determining of the motor output limit rate, when the temperature of the motor is greater than or equal to a reference value at which a limit on an output of the motor is started for the selected group of map data, the motor output limit rate determined based on the selected group of map data may be applied to a torque command or a current command of the motor determined by an input of a driver to decrease the output of the motor.

The plurality of groups of map data may be set such that a reference value for the temperature of the motor at which a limit on an output of the motor is started is greater in a lower altitude section.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
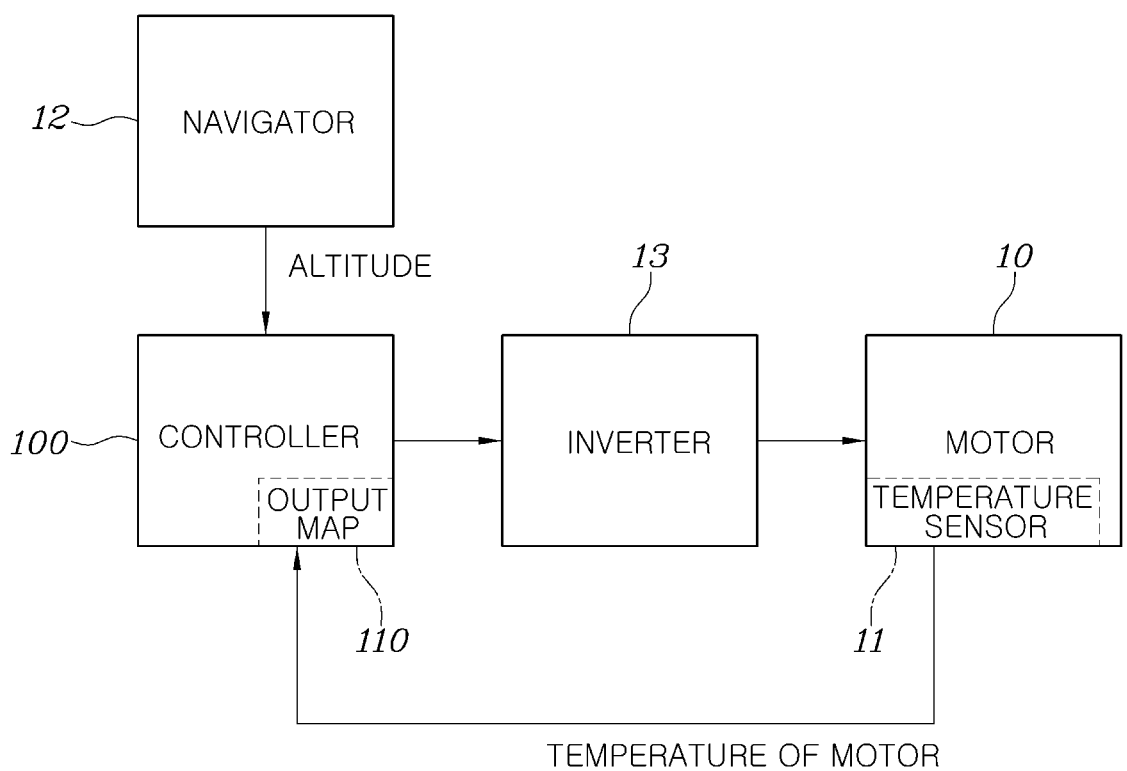
FIG. 1 is a block diagram of a motor control apparatus for securing insulation performance according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, a motor control apparatus and method for securing insulation performance according to various forms will be described in detail with reference to the accompanying drawings.

FIG. 1 is a block diagram of a motor control apparatus for securing insulation performance according to one form of the present disclosure.

Referring to FIG. 1, the motor control apparatus for securing insulation performance may include: a temperature sensor 11 detecting a temperature of a motor 10; an altitude detection means 12 providing information on an current altitude at which the motor 10 is positioned; and a controller 100 including a motor output map having a plurality of groups of map data in which motor output limit rates depending on temperatures of the motor are pre-stored for each preset altitude section, selecting one group of map data corresponding to the information on the altitude provided by the altitude detection means 12, and determining an output limit rate of the motor 10 by applying the temperature detected by the temperature sensor 11 to the selected group of map data.

The controller 100 may be implemented by at least one processor operated by a setting program, in which the setting program includes a series of commands for performing each step included in the control method according to the present disclosure to be described below.

The motor 10, which is a means for providing power for driving a vehicle, may be driven by a three-phase alternating current provided by an inverter 13.

The inverter 13 is a circuit converting direct current power stored in a battery (not shown) or the like into three-phase alternating current power to apply the three-phase alternating current power to the motor 10. In general, the inverter 13 generates a motor input current by controlling a plurality of switching elements (not shown) through pulse width modulation. The plurality of switching elements in the inverter 13 may be controlled by the controller 100 to be a turn-on state or a turn-off state.

The controller 100 may generate pulse width modulation signals for controlling the switching elements in the inverter 13 to generate an output of the motor corresponding to a driver's request. In a motor control method for an electrically-driven vehicle, the inverter 13 may be controlled in such a manner that a torque command is generated based on a degree in which the driver presses an accelerator pedal, a voltage command for a current (motor current) that is actually provided to the motor 10 to follow a current command corresponding to the torque command is generated by comparing the current command with the motor current, and a control signal (gate signal) for controlling the switching elements in the inverter 13 is generated to output a three-phase voltage corresponding to the generated voltage command. Such a motor control method is widely known in the field of technology to which the present disclosure pertains. Thus, further detailed description thereof is omitted.

Meanwhile, when a partial discharge occurs due to a difference in voltage between stator coils of the motor, coil coatings may be damaged, resulting in a deterioration in insulation performance. A partial discharge inception voltage (PDIV), at which the partial discharge starts to occur, is lower as the altitude and the temperature of the motor are higher.

According to the present disclosure, in view of the characteristic of the partial discharge inception voltage in relation to the altitude and the temperature, the output of the motor is limited more greatly, as the altitude and the temperature of the motor 10 are higher, to prevent the motor 10 from being driven under the altitude or temperature condition corresponding to the partial discharge inception voltage, thereby preventing the deterioration in insulation performance.

Here, the output of the motor may be understood to refer to a power of the motor or a torque of the motor.

To this end, the controller 100 may include a motor output map 110. The motor output map 110 may include data in which an output limit rate corresponding to the temperature of the motor detected by the temperature sensor 11 is pre-set. In particular, in one form of the present disclosure, the output map may include a plurality of groups of map data, each including motor temperature-output limit rates set for a respective altitude section.

Figure 2A:
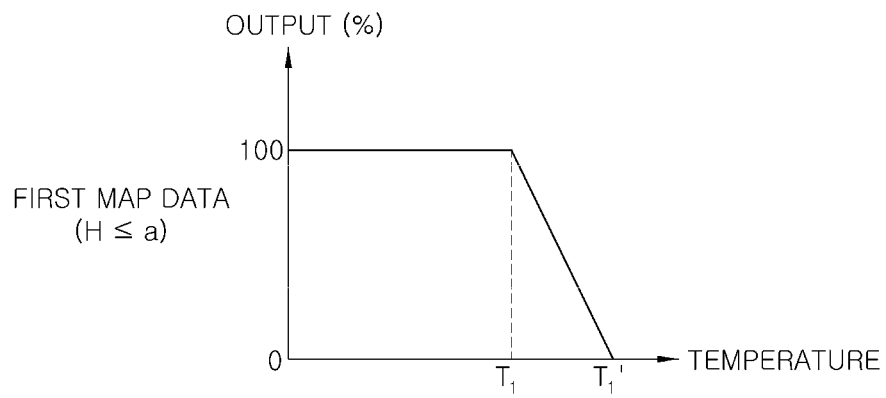
FIGS. 2A, 2B and 2C are diagrams respectively illustrating an example of a motor output map provided in the motor control apparatus for securing insulation performance in one form of the present disclosure.
Figure 2B:
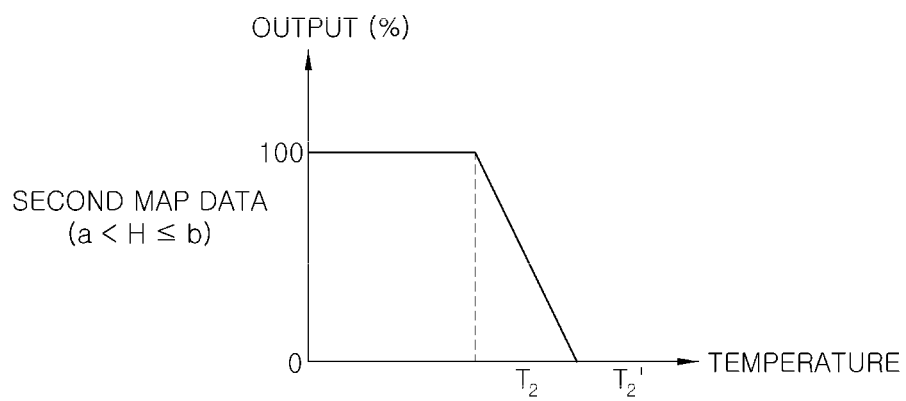
Figure 2C:
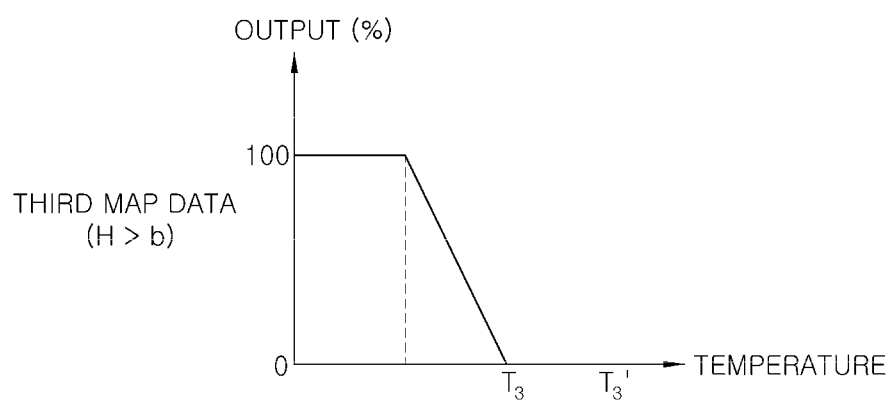

FIGS. 2A, 2B and 2C are diagrams respectively illustrating an example of the motor output map provided in the motor control apparatus for securing insulation performance in some forms of the present disclosure.

The example illustrated in FIG. 2A is an example in which altitudes H are pre-divided into three sections: H≤a, a<H≤b, and H>b, and a different group of map data is applied for each divided section.

In a case where an altitude H is smaller than or equal to "a", the map data is for controlling the output of the motor 10 to decrease when the temperature of the motor 10 becomes $T_1$ and controlling the output of the motor 10 not to be generated (to stop driving the motor) when the temperature of the motor 10 becomes $T_1'$ ($T_1'>T_1$).

In a case where an altitude H is greater than "a" and smaller than or equal to "b" as illustrated in FIG. 2B, the map data is for controlling the output of the motor 10 to decrease when the temperature of the motor 10 becomes $T_2$ and controlling the output of the motor 10 not to be generated (to stop driving the motor) when the temperature of the motor 10 becomes $T_2'$ ($T_2'>T_2$). In order to limit the output of the motor at a lower temperature in a higher altitude section, $T_2$ may have a smaller value than $T_1$ and $T_2'$ may have a smaller value than $T_1'$.

As illustrated in FIG. 2C, in a case where an altitude H is greater than "b", the map data is for controlling the output of the motor 10 to decrease when the temperature of the motor 10 becomes $T_3$ and controlling the output of the motor 10 not to be generated (to stop driving the motor) when the temperature of the motor 10 becomes $T_3'$ ($T_3'>T_3$). In order to limit the output of the motor at a lower temperature in a higher altitude section, $T_3$ may have a smaller value than $T_2$ and $T_3'$ may have a smaller value than $T_2'$.

In another form of the present disclosure, the limit on the output may be achieved in such a manner that a torque command set when a driver presses an accelerator pedal or the like or a current command corresponding to the torque command is decreased according to a limit rate determined based on the motor output map.

The altitude detection means 12 may be implemented with a navigator provided in the vehicle. The navigator 12 is a system calculating a current position (a current latitude, a current longitude, and a current altitude) of the vehicle using a global positioning system (GPS) signal received from a GPS satellite. Through the navigator 12 provided in the vehicle, an altitude level at which the vehicle, that is the motor, is currently positioned may be obtained.

As an alternative way of obtaining altitude information, it may be considered to utilize a database provided in the navigator 12. The navigator 12 may pre-store an altitude of a position corresponding to a latitude and a longitude determined by using a GPS signal in the database. The navigator 12 may detect a latitude and a longitude using a GPS signal, output altitude information corresponding to the detected latitude and longitude utilizing the pre-stored database, and provide the altitude information to the controller 100.

As another alternative way of obtaining altitude information, a separate altimeter provided in the vehicle may be utilized. Generally, the altimeter may estimate altitude information of the vehicle based on a change in atmospheric pressure and provide the altitude information to the controller 100.

Figure 3:
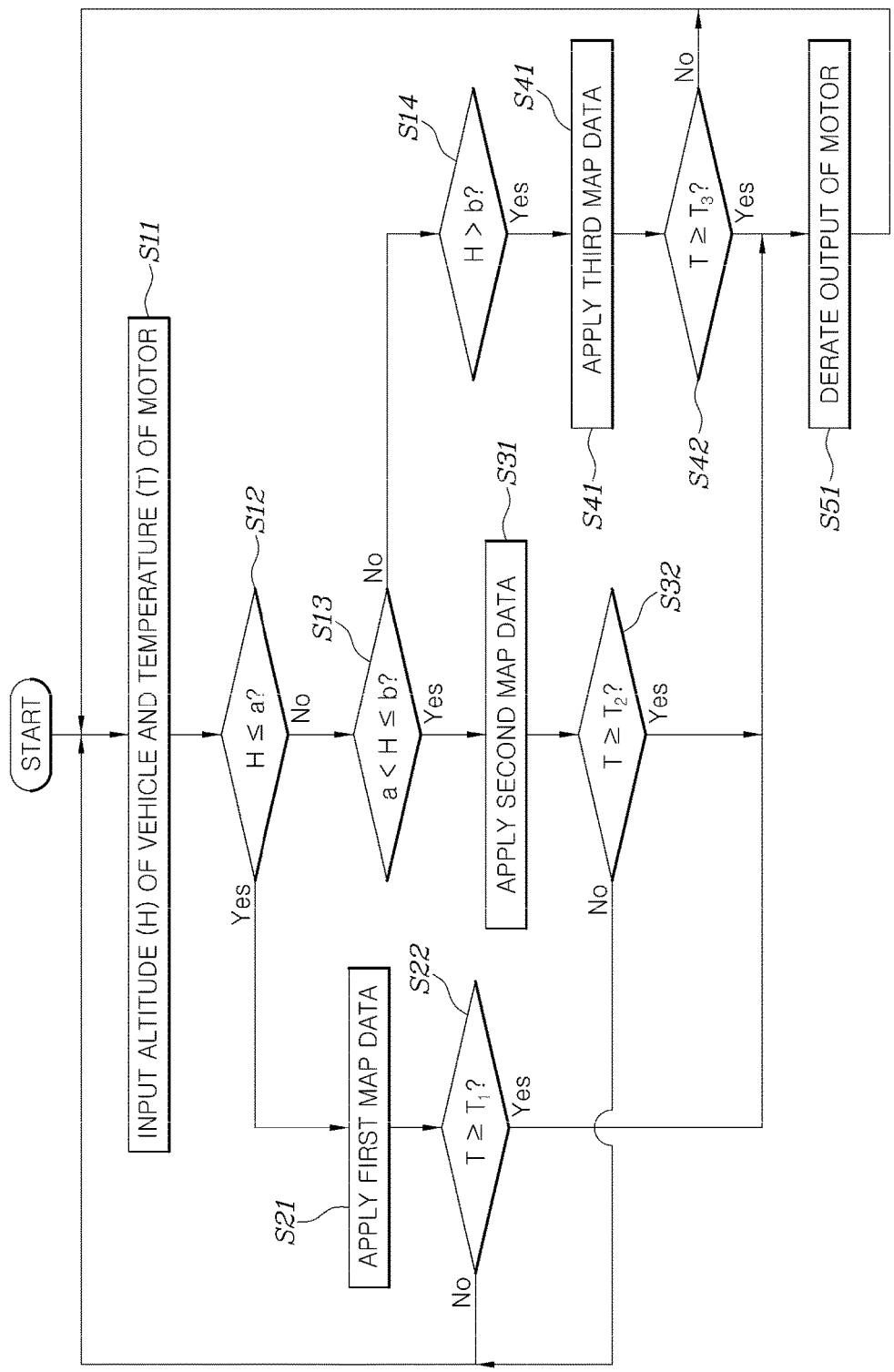
FIG. 3 is a flowchart of a motor control method for securing insulation performance according to another form of the present disclosure.

FIG. 3 is a flowchart of a motor control method for securing insulation performance according to another form of the present disclosure. The form illustrated in FIG. 3 is based on the example in which map data is pre-set for each of the three altitude sections as in FIGS. 2A, 2B and 2C.

Referring to FIG. 3, the controller 100 may receive altitude information H from the altitude detection means 12 and receive a temperature T of the motor from the temperature sensor 11 provided in the motor 10 (S11).

Subsequently, the controller 100 may compare the received altitude information H with reference values a and b by which the map data in the motor output map is divided (S12, S13 and S14).

When the altitude information H is smaller than or equal to the reference value a, the controller 100 may select first map data (S21). When the temperature T of the motor 10 is greater than or equal to a preset reference value $T_1$ (S22), the controller 100 may limit (derate) the output of the motor at a rate corresponding to the temperature T of the motor (S51).

When the altitude information H is greater than the reference value a and smaller than or equal to the reference value b, the controller 100 may select second map data (S31). When the temperature T of the motor 10 is greater than or equal to a preset reference value $T_2$ (S32), the controller 100 may limit (derate) the output of the motor at a rate corresponding to the temperature T of the motor (S51).

In addition, when the altitude information H is greater than the reference value b, the controller 100 may select third map data (S41). When the temperature T of the motor 10 is greater than or equal to a preset reference value $T_3$ (S42), the controller 100 may limit (derate) the output of the motor at a rate corresponding to the temperature T of the motor (S51).

In S51, when the temperature T of the motor is greater than or equal to the reference value $T_1$, $T_2$ or $T_3$, at which the limit on the output is started, the output of the motor may be limited in such a manner that the output of the motor is decreased by applying an output limit rate determined based on the respective group of data map to a torque command or a current command of the motor determined by an input of the driver.

According to the motor control apparatus and method for securing insulation performance, the output of the motor is limited as pre-set based on the altitude of the electric vehicle and the temperature of the motor provided in the electric vehicle to avoid the condition corresponding to the partial discharge inception voltage, which becomes lower depending on the altitude or the temperature, in the motor, thereby preventing the deterioration in insulation performance resulting from the damage to the coatings of the motor stator coils due to the occurrence of the partial discharge.

The effect obtainable from the present disclosure is not limited to the above-mentioned one, and other effects that are not mentioned above may be clearly understood from the description above by those having ordinary knowledge in the field of technology to which the present disclosure pertains.

Although the present disclosure has been shown and described with respect to specific forms, it will be apparent to those having ordinary skill in the art that the present disclosure may be variously modified and altered without departing from the spirit and scope of the present disclosure.

What is claimed is:

1. A motor control apparatus for securing insulation performance, the motor control apparatus comprising:
   a temperature sensor configured to detect a temperature of a motor;
   an altitude detection means configured to provide a current altitude of the motor at which the motor is positioned; and
   a controller including a motor output map having a plurality of groups of map data in which motor output limit rates depending on temperatures of the motor are pre-stored for each preset altitude section, the controller configured to:
      select one group of map data, among the plurality of groups of map data, based on the current altitude of the motor provided by the altitude detection means, and
      determine a motor output limit rate by applying the temperature detected by the temperature sensor to the selected group of map data,
      determine an output of the motor by applying the motor output limit rate determined based on the selected group of map data to a torque command or a current command of the motor determined by a driver of a vehicle including the motor, wherein the output of the motor is determined by decreasing the torque command or the current command of the motor according to the motor output limit rate.

2. The motor control apparatus of claim 1, wherein the altitude detection means is a navigator configured to provide the current altitude of the motor based on a current altitude of a vehicle including the motor through a global positioning system (GPS) signal.

3. The motor control apparatus of claim 1, wherein:
   the altitude detection means is a navigator having a database in which altitude information depending on latitude information and longitude information is pre-stored,
   the altitude detection means is configured to calculate a current latitude and a current longitude of a vehicle including the motor based on a signal from a global positioning system (GPS) and derive the current altitude of the motor from the database based on the calculated latitude and longitude of the vehicle.

4. The motor control apparatus of claim 1, wherein the plurality of groups of map data are set such that a reference value for the temperature of the motor at which a limit on the output of the motor is started is greater in a lower altitude section.

5. A motor control method for controlling a motor, the motor control method comprising:

receiving, by a controller, a current altitude of a motor from a navigator and a temperature of the motor from a temperature sensor;

selecting, by the controller, a group of map data, among a plurality of groups of map data in which motor output limit rates depending on temperatures of the motor are pre-stored for each preset altitude section, by comparing the current altitude with a reference value;

determining, by the controller, a motor output limit rate from the selected group of map data based on the temperature of the motor;

determining, by the controller, an output of the motor by applying the motor output limit rate determined based on the selected group of map data to a torque command or a current command of the motor determined by a driver of a vehicle including the motor, wherein the output of the motor is determined by decreasing the torque command or the current command of the motor according to the motor output limit rate.

6. The motor control method of claim 5, wherein in the determining of the motor output limit rate, when the temperature of the motor is greater than or equal to a reference value at which a limit on the output of the motor is started for the selected group of map data, applying the motor output limit rate determined based on the selected group of map data to a torque command or a current command of the motor determined by an input of a driver to decrease the output of the motor.

7. The motor control method of claim 5, wherein the plurality of groups of map data are set such that a reference value for the temperature of the motor at which a limit on the output of the motor is started is greater in a lower altitude section.

* * * * *